Aug. 29, 1950

H. P. CURLEE 2,520,493

SANDWICH MAKING MACHINE

Filed Aug. 4, 1945

INVENTOR.
Harvey P. Curlee
Harley L. Parrott,
BY attorney

Aug. 29, 1950     H. P. CURLEE     2,520,493
SANDWICH MAKING MACHINE
Filed Aug. 4, 1945     4 Sheets-Sheet 2

INVENTOR.
Harvey P. Curlee
BY Warley L. Parrott,
Attorney

Aug. 29, 1950     H. P. CURLEE     2,520,493
SANDWICH MAKING MACHINE
Filed Aug. 4, 1945     4 Sheets-Sheet 3
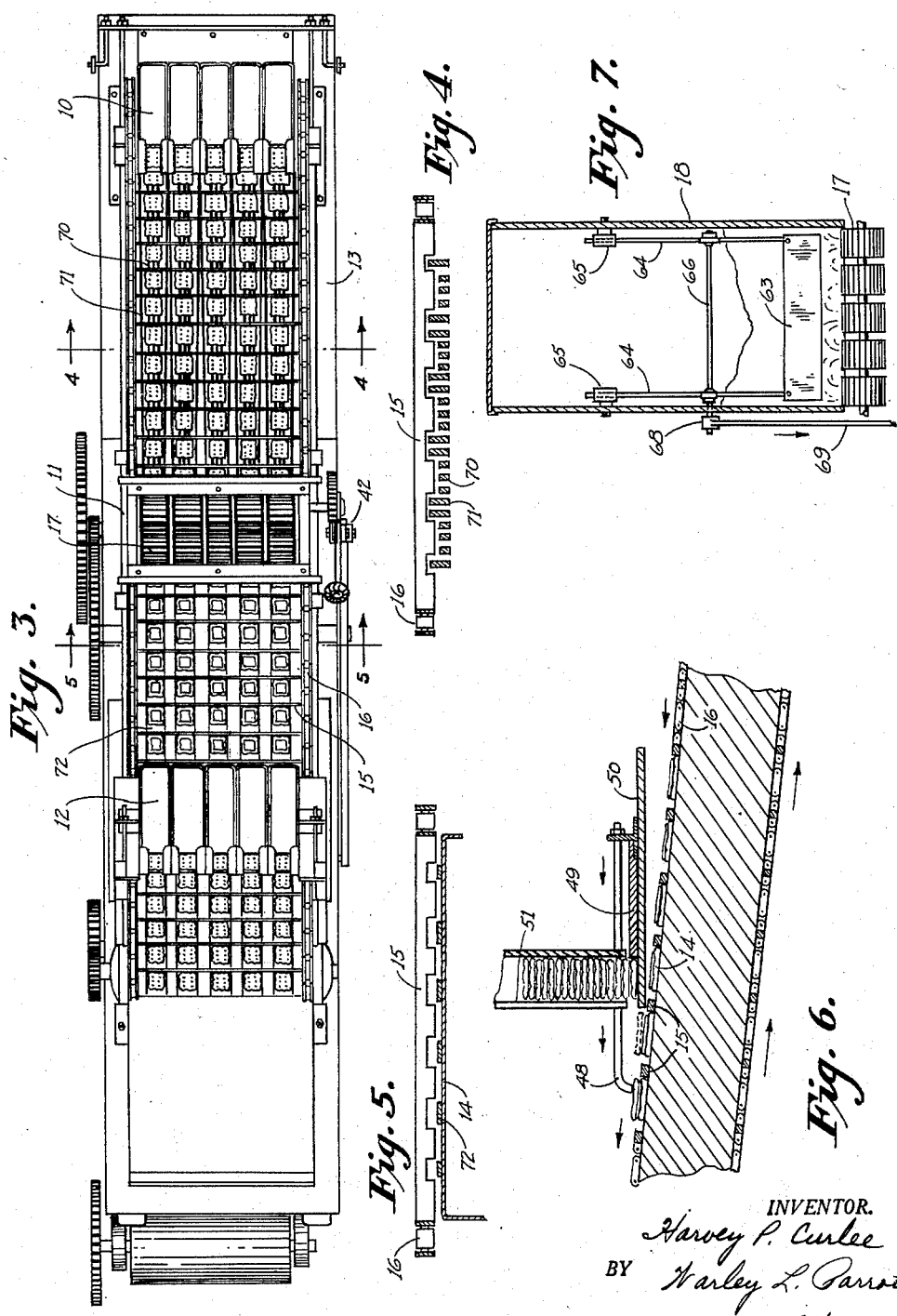

Aug. 29, 1950        H. P. CURLEE        2,520,493
SANDWICH MAKING MACHINE
Filed Aug. 4, 1945        4 Sheets-Sheet 4
*Fig. 8.*
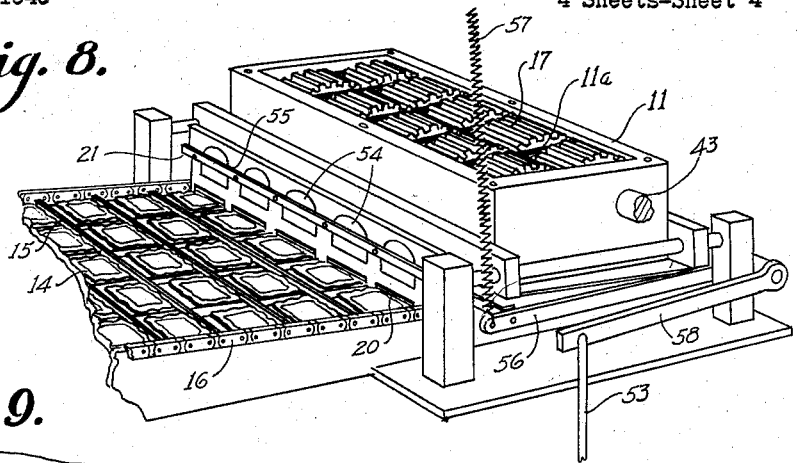
*Fig. 9.*
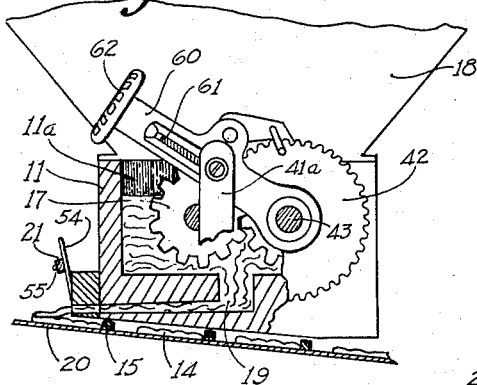
*Fig. 10.*
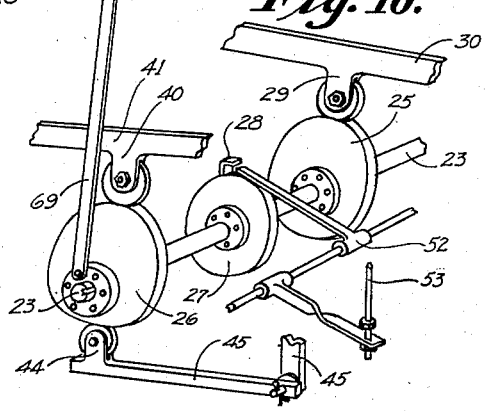
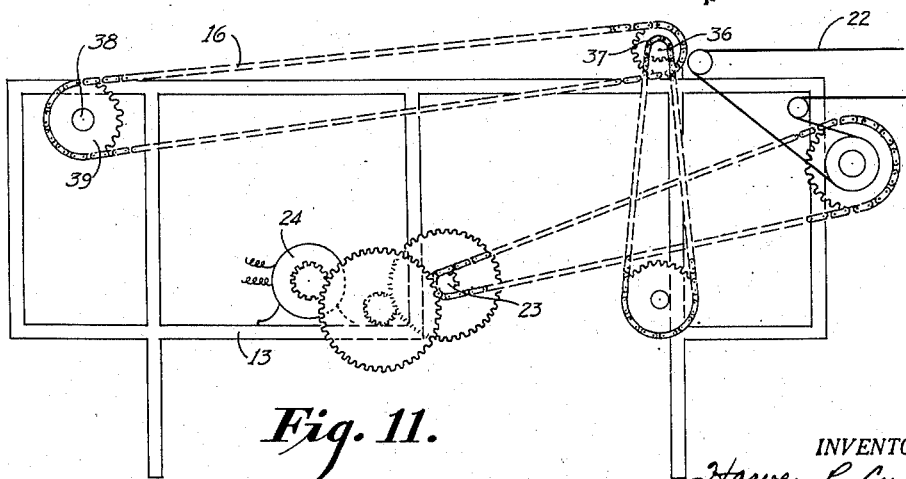
*Fig. 11.*
INVENTOR.
Harvey P. Curlee
BY Harley L. Parrott,
Attorney Patented Aug. 29, 1950

2,520,493

UNITED STATES PATENT OFFICE 2,520,493

SANDWICH MAKING MACHINE

Harvey P. Curlee, Charlotte, N. C., assignor to Lance Inc., a corporation of North Carolina Application August 4, 1945, Serial No. 608,946

6 Claims. (Cl. 107—1)

This invention relates to sandwich making machines, and more particularly to machines for assembling sandwiches having filling material, such as peanut butter or marshmallow, deposited between crackers or the like.

Generally described, the sandwich making machine of the present invention comprises means for supplying crackers to be deposited with filling material, means for depositing filling material on these crackers, and means for supplying additional crackers for combination with crackers deposited with filling material to complete sandwiches, all of the above mentioned elements being arranged in relation to a conveying means for handling the crackers during the sandwich making operation.

In the sandwich making machines heretofore available, the sandwich making operation has been hampered, and the speed with which the operation could be carried out has been limited, by the complicated depositing mechanisms used. Machines for assembling sandwiches of the type contemplated by the present invention are commonly equipped with a depositing mechanism which comprises a hopper adapted to contain a supply of filling material and having an open bottom. These hoppers are mounted on a plate containing openings corresponding to the size of crackers to be deposited with filling material and the hopper is arranged on the plate so that it may be reciprocated over these openings so that crackers disposed underneath the plate at these openings will be deposited with filling material which is sheared off, so to speak, from the body of filling material presented to these openings as the hopper slides over them. An arrangement of this sort requires special means to present the crackers at the openings in the plate on which the filling material supply hopper operates which unduly complicates the sandwich making apparatus, and the necessity for allowing time for the hopper containing the filling material to reciprocate in relation to the openings in the bottom plate necessarily results in slower operation.

According to the present invention these difficulties are obviated by the provision of a depositing mechanism adapted to deliver filling material directly onto crackers as they are conveyed through the machine. The depositing mechanism of my invention comprises a plurality of meshing pairs of fluted rollers adapted for feeding material from a supply reservoir. These fluted rollers are arranged in delivery relation to orifices which are adapted to form the filling material fed from the fluted rollers into a strip corresponding to the size of the crackers to be deposited with filling material. The depositing mechanism is arranged in relation to the other elements of the machine so that the strips of filling material are directed onto the crackers while they are in motion, and means are associated with the orifices for severing the strips of filling material when they have been deposited in sufficient length on the crackers. The depositing mechanism of my invention effects a positive flow of filling material in regulated amounts and is arranged for operation in close correlation with the other elements of the sandwich making machine so that the crackers can be deposited with filling material while they are in motion.

Another important feature of my invention is the provision of conveying means arranged with an inclined disposition to present the crackers properly during the depositing operation. As the deposit of filling material is delivered from orifices arranged in the depositing mechanism, it is only necessary to present the crackers for depositing as they pass these orifices. Otherwise, it is highly desirable to maintain an adequate clearance of the crackers from the depositing mechanism so that the possibility of jamming is eliminated and the machine may be more easily cleaned. The inclined disposition of the conveying means of this invention provides a convenient manner for accomplishing this result. Moreover, the inclined disposition of the conveying means maintains the crackers under better control and reduces the tendency for them to shift transversely as they move through the machine.

The conveying means used comprises a surface having an inclined disposition as mentioned above which is arranged to receive and support crackers to be deposited with filling material. The inclination of this surface is upwardly toward the rear of the machine, so that the crackers are directed on this surface to move upwardly and beyond the depositing mechanism as they receive the filling material. Cross members movable in relation to this inclined surface are actuated to advance crackers upwardly on this surface during the sandwich making operation. These cross members are actuated intermittently in relation to the inclined surface and the elements of the machine are correlated so that crackers are transferred to the conveyor surface while these cross members are at rest and filling material is deposited from the above mentioned orifices while the cross members are moved. As a result, the introduction of crackers for the sandwich making operation and the depositing of filling material proceed in a rapid, step-by-step manner which allows substantially increased production and eliminates complicated handling means. Also, the above noted arrangement of the inclined conveyor surface by which the crackers are directed to move upwardly and beyond the depositing mechanism during delivery of the filling material, results in disposing the crackers so that the filling material is delivered in a substantially horizontal plane from the depositing mechanism orifices and thereby laid on the crackers in a particularly regular and even manner.

My invention is illustrated in the accompanying drawing in which:

Fig. 3 is a corresponding plan view in which a modification of the conveying means is illustrated;

Fig. 4 is a section, mainly diagrammatic, of the modified conveying means on the line 4—4 of Fig. 3;

Fig. 5 is a similar section on the line 5—5 of Fig. 3;

Fig. 6 is a fragmentary detail showing the arrangement of means for feeding crackers to the machine;

Fig. 7 is a vertical section showing the arrangement of the filling material reservoir which is arranged in relation to the depositing mechanism;

Fig. 8 is a fragmentary perspective view of the depositing mechanism with the filling material reservoir removed;

Fig. 9 is a fragmentary detail of the pawl and ratchet arrangement for driving the depositing mechanism;

Fig. 10 is a diagrammatic representation of the arrangement of the actuating mechanism; and Fig. 11 is a diagrammatic representation of the motor drive connections.

Figure 1:
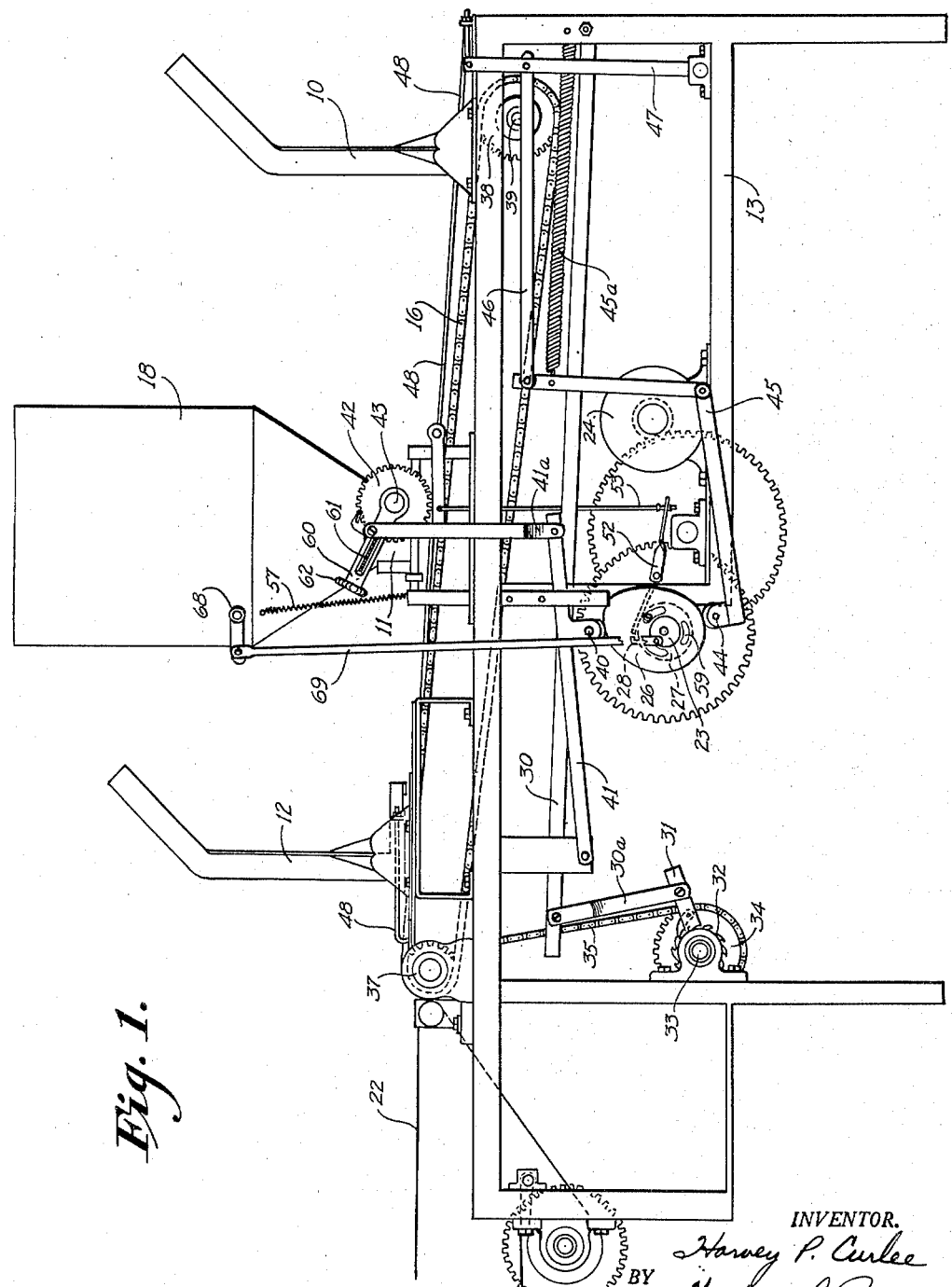
Fig. 1 is a side elevation of a sandwich making machine constructed according to my invention.

As illustrated in the drawing, the sandwich making machine of my invention comprises a front cracker hopper 10 for containing a supply of crackers to be deposited with filling material, a mechanism for depositing filling material indicated generally at 11, and a rear cracker hopper 12 for containing additional crackers to be combined with crackers deposited with filling material to complete sandwiches, arranged in sequence in relation to a conveying means on a suitable supporting frame 13. Both the cracker hoppers 10 and 12 are formed to accommodate a number of columns of crackers corresponding to the number of sandwiches to be made at one time, which as illustrated in the present instance is five. Crackers are fed from the cracker hoppers 10 and 12 onto the conveying means by a push plate arrangement to be described more in detail below.

The conveying means is composed of an upwardly inclined surface 14 arranged to receive and support crackers fed from the front cracker hopper 10 to be deposited with filling material, and spaced cross members 15 which are movable in relation to the inclined surface 14 to advance the crackers upwardly on the surface 14 to receive a deposit of filling material and be combined with crackers fed from the rear cracker hopper 12 to complete sandwiches.

The spaced cross members 15 are supported at each side of the inclined conveyor surface 14 on sprocket chains 16 and are advanced intermittently during operation of the machine. Crackers are fed onto the inclined conveyor surface 14 from the front cracker hopper 10 as mentioned above in relation to the intermittent advance of the spaced cross members 15 so that they are placed on the inclined conveyor surface 14 in the spacings between the cross members 15 while these members are at rest. The crackers placed on the inclined conveyor surface 14 in this manner are then advanced in step-by-step fashion by reason of the intermittent advance of the cross members 15 to a position adjacent the mechanism for depositing filling material 11.

The depositing mechanism 11 is essentially a gear pump in which a plurality of meshing pairs of fluted rollers 17 are arranged in correspondence with the rows of crackers being advanced by the conveyor means. A reservoir portion 18 adapted to contain a supply of filling material is arranged above the depositing mechanism 11, and each pair of fluted rollers 17 operates to feed filling material supplied from the reservoir portion 18 downwardly into channels 19, partitions as at 11a being provided to compartment the depositing mechanism housing 11 so that each pair of fluted rollers 17 is disposed in delivery relation to an associated channel 19. The channels 19 extend horizontally and rearwardly with respect to the machine to orifices 20 through which the filling material is forced as a result of the feeding action of the fluted rollers 13. The orifices 20 are adapted to form the filling material forced through them in this manner in strips corresponding to the size of the crackers on which the filling material is to be deposited.

The inclined conveyor surface 14 has an inclination such that the crackers to be deposited with filling material are moved to a position closely adjacent the rearwardly opening orifices 20 as the spaced cross members 15 advance them past the depositing mechanism 11. This arrangement allows the strip of filling material issuing from the orifices 20 to be directed in a substantially horizontal plane onto the crackers (compare Fig. 9), and the depositing operation is timed to occur during an intermittent advance of the crackers by the cross members 15 so that the issuing strip of filling material is taken onto the moving crackers. When a sufficient filling length has been deposited on the crackers the strips of filling material are severed by a knife mechanism 21 associated with the orifices 20.

Crackers fed onto the inclined conveyor surface 14 and deposited with filling material as just described, are then advanced further up the surface 14 as these operations are repeated with succeeding series of crackers, to the position of the rear cracker hopper 12 at which point additional crackers are fed from this hopper on top of the crackers which have been deposited with filling material to thus complete sandwiches. Beyond the rear cracker hopper 12, the completed sandwiches are transferred to a conveyor belt 22, driven from motor 24 as illustrated diagrammatically in Fig. 11, arranged to carry them to a packaging station.

The operation of the various elements of the machine is synchronized in relation to a single driving means. This result is accomplished by actuation of the various elements from a cam shaft 23 which may be driven through an appropriate gear train or the like from a motor 24. The cam shaft 23 carries three cams which may be identified as a conveyor cam 25, a depositing mechanism cam 26, and cut-off cam 27. The conveyor cam 25 and the depositing mechanism cam 26 are identical in shape, and are formed to provide substantially constant linear motion for a cam follower during half a revolution with a quick return movement during the other half revolution. The cut-off cam 27 is a trip cam having a protruding trip surface 28 arranged on a circular body.

The conveyor cam 25 is arranged to actuate the intermittent advance of the spaced cross members 15 on the inclined conveyor surface 14. For this purpose a cam follower 29 for cam 25 is mounted on a pivoted lever 30 which extends to a connection, such as through link 30a, with a pawl lever 31 of a pawl and ratchet assembly 32 mounted on a shaft 33. The pivoted lever 30 is arranged so that intermittent rotation of the shaft 33 is effected through the pawl and ratchet assembly 32 as the cam follower 29 rises and falls with rotation of cam 25, and as cam 25 is arranged for constant lineal speed actuation of the cam follower 29 each intermittent rotation of the shaft 33 will also be at constant speed.

A sprocket wheel 34 is also mounted on shaft 33 and carries a chain 35 running to a sprocket wheel (not shown) mounted on a shaft 36 which carries sprocket wheels 37 on which the previously mentioned sprocket chains 16 supporting the conveyor cross members 15 are mounted at one end of the inclined conveyor surface 14. Similar sprocket wheels 38 mounted on a shaft 39 carry the sprocket chains 16 at the other end of the inclined surface 14. These connections provide the means for advancing the cross members 15 intermittently at constant speed over the inclined conveyor surface 14.

The depositing mechanism cam 26 operates the depositing mechanism 11 on one stroke and feeds crackers from the cracker hoppers 10 and 12 on the opposite stroke. For actuating the depositing mechanism the cam 26 is associated with a cam follower 40 mounted on a pivoted arm 41 which is linked, as by a member 41a, to a pawl and ratchet assembly 42 mounted on a shaft 43 which also carries one roller of each of the meshed pairs of fluted rollers 17. Rotation of the cam 26 accordingly effects intermittent feeding actuation of the fluted rollers 17, and as cam 26 is identical with cam 25 this actuation can be made to correspond with the intermittent advance of the spaced cross members 15 so that filling material can be forced through the orifices 20 in depositing relation to crackers advanced past the depositing mechanism 11.

As mentioned above the cam 26 is also arranged to feed crackers on to the inclined surface 14 on the opposite stroke. For this purpose a second cam follower 44 is disposed, in a diametrically opposite position from cam follower 40, on a bell crank 45, which is fitted with a spring 45a so that cam follower 44 is maintained in contact at all times with cam 26. The bell crank 45 is connected through suitable linkages, such as cross member 46 and pivoted member 47, to shift rods 48 which are in turn connected to push plates 49 arranged at the bottom of the cracker hoppers 10 and 12 (see Fig. 6). Crackers contained in the hoppers 10 and 12 normally rest on a bottom plate 50 which is vertically spaced a distance sufficient to allow thickness clearance for a cracker below the lower openings of guideways 51 for the cracker columns. The push plates 49 are disposed to operate in this spacing when actuated by the shift rods 48 so that crackers are stripped from the columns contained in the hoppers 10 and 12 and pushed off of the bottom plate 50 onto the inclined conveyor surface 14 in the spacing between the cross members 15, or onto crackers which have been deposited with filling material as the case may be. As the actuation of the push plates 49 is effected from cam 26 on the reverse stroke, the conveyor cross members 14 are at rest when the crackers are fed from hoppers 10 and 12 in this manner.

The cut-off cam 27 is arranged to actuate the knife mechanism 21 associated with orifices 20 of the depositing mechanism 11. This cam 27 as previously mentioned comprises a circular body provided with a protruding trip surface 28. A pivoted lever 52 is mounted to ride cam 27, and a link member 53 extends from the pivoted lever 52 to the knife mechanism 21. The knife mechanism 21 comprises a series of blade members 54 mounted on a crossbar 55 for sliding movement across the orifices 20 so as to sever the strips of filling material issuing from these orifices 20 when desired. The crossbar 55 is attached at each end to side arms 56 which are pivoted on the depositing mechanism 11 and are normally held in raised position by a spring 57 so that the blade members 54 uncover the orifices 20. A third arm 58 associated with the side arms 56 is connected with the link 53 extending from the pivoted lever 52 for cam 27. By this arrangement the side arms 56 are depressed whenever the pivoted lever 52 is tripped by cam 27 so that the blade members 54 are lowered momentarily to sever the filling material strips forced through the orifices 20. As described more in detail below, cam 27 is arranged to trip the knife mechanism 21 in this manner at the end of the depositing mechanism feed stroke actuated through cam 26.

A cycle of operation for the machine may be described by starting with the step of supplying crackers from the hoppers 10 and 12. As mentioned above, the crackers are fed by actuation of the push plates 49 on the downward stroke of cam 26 while the other elements of the machine are at rest. The conveyor cross members 15 are spaced so that the crackers may be disposed between them on the inclined conveyor surface 14, and the sprocket chains 16 are adjusted to position the cross member 15 so that the crackers may be placed on the inclined surface 14 in this manner when the cross members are at rest. Continued rotation of cam 26 for an upward stroke then actuates the fluted rollers 17 of the depositing mechanism 11 to force filling material into channels 19 and in turn through orifices 20. The upward stroke of cam 25 is adjusted to correspond with that of cam 26 so that an intermittent advance of the conveyor cross member 15 is effected simultaneously with feeding of filling material through the orifices 20. With some filling materials it may be desirable to retard operation of cam 25 slightly behind cam 26 so that the issuance of filling material from the orifices 20 will be insured before movement of the crackers by cross members 15 has been started. For the purpose of adjusting cams 25 and 26 in this manner they are suitably provided with an elongated slot and bolt mounting 59 as illustrated in Fig. 1.

To provide further means for adjusting the feeding action of the depositing mechanism 11 the pawl and ratchet assembly 42 includes a pawl lever 60 having an adjusting screw 61 operated by a hand wheel 62 arranged at the extending end of the pawl lever 60. The adjusting screw 61 carries a block (not shown) to which the link member 41a is attached. By adjusting the screw 61 to vary the position of the point of attachment of link member 41a with respect to the pivot point of pawl lever 60 the extent of the rotation of the fluted rollers 17 effected by any given actuation by cam 26 can be varied to cause the depositing mechanism to feed a desired strip length of filling material.

As cams 25 and 26 reach the end of their upward strokes, the conveyor cross members 15 and consequently the crackers will stop and the depositing mechanism 11 will discontinue feeding filling material. At this point cam 27 is adjusted to trip the knife mechanism 21 and sever the strips of filling material which have issued from the orifices 20. Continued operation in this manner advances rows of crackers in series on to the inclined conveyor surface 14 and past the depositing mechanism 11 and finally to the position of the rear cracker hopper 12 where crackers are placed on top of the crackers which have been deposited with filling material to complete sandwiches.

Figure 2:
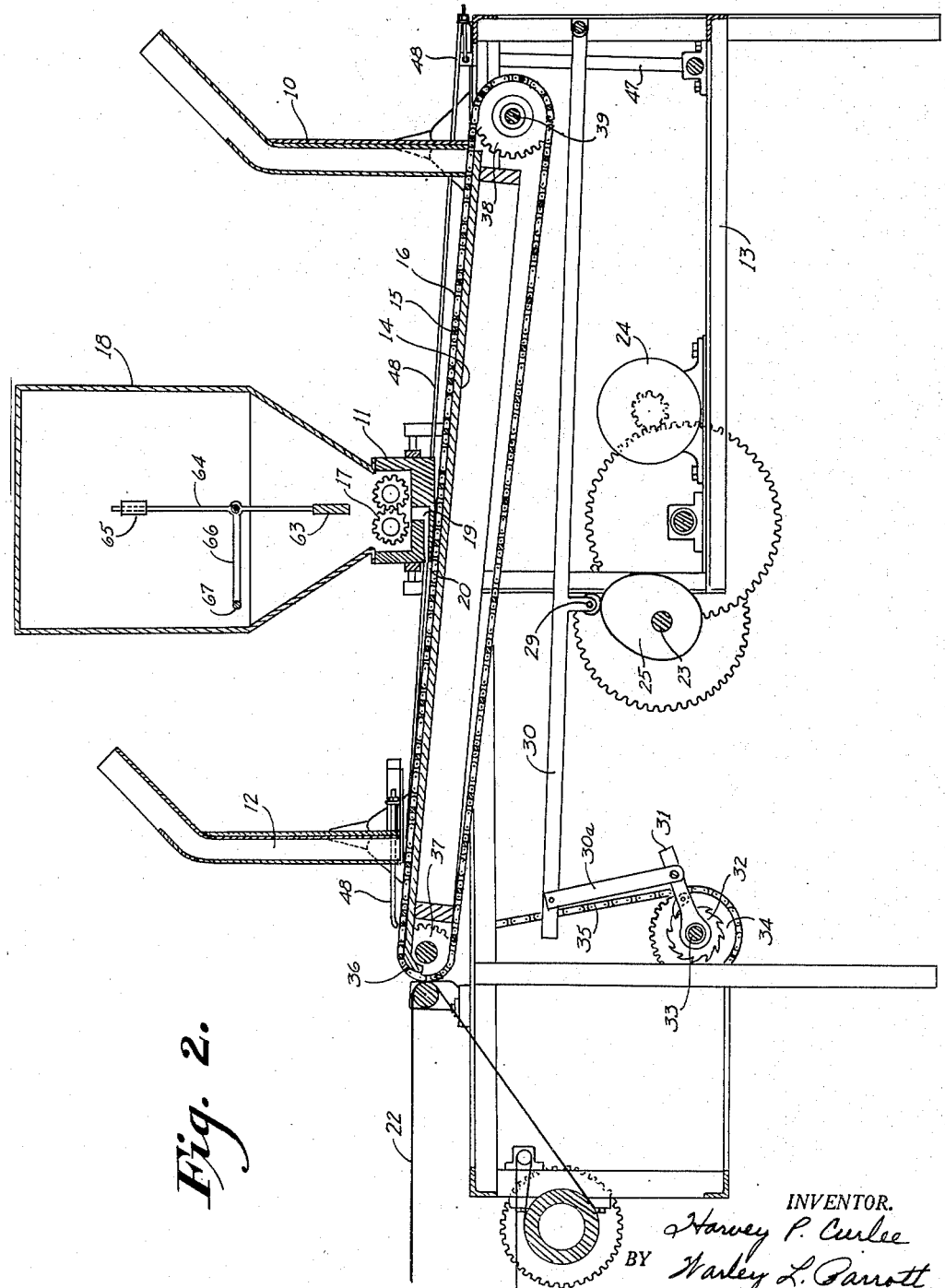
Fig. 2 is a corresponding vertical section.

In handling certain types of filling material it is often desirable to provide an agitating arrangement in the reservoir portion 18 of the depositing mechanism 11 to insure that filling material is presented to the fluted rollers 17 free of entrained air. If air bubbles are allowed to accumulate in the filling material they have a tendency to attach themselves to the fluted rollers 17 and to continue to revolve with them so that they displace filling material which would normally be fed by the depositing mechanism and consequently result in uneven feeding. To obviate this result I have obtained good results by mounting a plunger member 63 inside the reservoir portion 18. This plunger member 63 suitably comprises a wooden cross piece positioned over the fluted rollers 17 as illustrated in Figs. 2 and 5. The plunger 63 is mounted on vertical rods 64 which are slidingly received at their upper ends in pivoted bushings 65 which are mounted on the walls of the reservoir portion 18. The arms 64 are pivotably connected about midway of their length with arms 66 extending from a shaft 67 which extends across the reservoir portion 18 at one side and carries an external arm 68 connected through a crank linkage 69 to cam shaft 23. Rotation of the cam shaft 23 during operation of the machine accordingly causes reciprocation of the plunger 63 so that the filling material above the fluted rollers 17 is continually agitated and any entrained air bubbles are caused to rise in the filling material and escape.

In instances where particularly brittle cracker material is being used for sandwich making operations so that considerable breakage of crackers has to be dealt with, I have also found it desirable to modify the conveyor surface 14 as illustrated in Fig. 3. According to this modification the conveyor surface 14 is formed with a slotted or screened construction between the front cracker hopper 10 and the depositing mechanism 11. As illustrated in Fig. 3 the slotted construction is obtained with spaced bars 70 having intermediate raised bars 71 forming guideways for the crackers, which may converge slightly in the direction of the depositing mechanism 11 as shown. The spaced bars 70 are arranged with their top surfaces even with the continuing inclined surface 14 beyond the depositing mechanism 11. The bars 71 may be raised any desired degree above the spaced bars 80 and if necessary the cross members 14 may be slotted to fit over the raised bars 71 (see Fig. 4) so as to insure that they will engage and advance the crackers resting on the spaced bars 70. This arrangement has the distinct advantage that broken crackers are or may be caused to fall through the spaced bars 70 and thus clear the machine before the depositing mechanism is reached and also a broken cracker in one row cannot be shifted to disturb the crackers in another row. The guideways formed by the raised bars 71 may be continued on the conveying surface 14 by disposing spacing strips 72 as illustrated in Fig. 5. Guideways of this sort are advantageously used in working with crackers, such as circular crackers, having a shape which tends to induce shifting on the conveying surface 14.

Whether the inclined conveyor surface 14 is modified in the manner just described or not will depend principally upon the degree of breakage encountered with the type crackers being used for making sandwiches. In any event it is highly important to maintain the inclined disposition of the conveyor surface 14. This inclination allows the crackers to be advanced past the depositing mechanism with a substantial clearance except at a point adjacent the orifices 20 where the depositing operation is effected. The clearance which is thus provided by the inclined conveyor surface 14 allows the machine to be easily cleaned and prevents jamming of the crackers as they pass under the depositing mechanism 11. Also, as previously pointed out, this inclined disposition of the conveyor surface allows the filling material to be delivered onto the crackers in a substantially horizontal plane which results in laying the filling material on the crackers with particular evenness so that sandwiches are produced on the machine of the present invention in an exceptionally regular and dependable manner.

I claim:

1. In a sandwich machine of the character described, the combination with a filling material depositing mechanism having an orifice opening in a vertical plane and a horizontal channel for directing filling material through this orifice so that the filling material issues in a substantially horizontal plane, of an upwardly inclined conveying means passing in close angular relationship upwardly and beyond the orifice of said depositing mechanism comprising an upwardly inclined surface arranged to receive and support crackers to be deposited with filling material, and spaced cross members actuated intermittently in relation to said inclined surface for advancing crackers upwardly on said inclined surface to receive a deposit of filling material, the intermittent actuation of said cross members being timed in relation to the operation of said depositing mechanism whereby said crackers are deposited with filling material while said crackers are moved, and the inclination of said conveying means being such that the moving crackers are disposed to receive the filling material as it issues in a substantially horizontal plane from the depositing mechanism.

2. In a sandwich making machine of the character described, the combination of a filling material depositing mechanism comprising a plurality of meshing pairs of fluted rollers adapted for feeding filling material, a corresponding number of orifices opening in a vertical plane and adapted to form said filling material into strips, and a horizontal channel leading from each of said pairs of fluted rollers to the corresponding orifice for directing filling material through said orifice so that the filling material strips issue in a substantially horizontal plane; and an upwardly inclined conveying means passing in close angular relationship upwardly and beyond the orifices of said depositing mechanism comprising an upwardly inclined surface arranged to receive and support crackers to be deposited with filling material, and spaced cross-members actuated intermittently in relation to said inclined surface for advancing crackers upwardly on said inclined surface to receive a deposit of filling material, the intermittent actuation of said cross members being timed in relation to the operation of said depositing mechanism whereby said crackers are deposited with filling material while said crackers are moved, and said upwardly inclined surface being disposed to direct the moving crackers upwardly and beyond said depositing mechanism whereby said strips of filling material are directed in a substantially horizontal plane onto said crackers.

3. In a sandwich making machine of the character described, the combination of a filling material depositing mechanism comprising a plurality of orifices, a pair of meshing fluted rollers arranged for feeding operation in delivery relation to each of said orifices, said orifices opening in a vertical plane and being adapted to form a strip of filling material corresponding to the size of crackers to be deposited with filling material, and means associated with said orifices for severing said strips of filling material in filling lengths; and an upwardly inclined conveying means passing in close angular relationship upwardly and beyond the orifices of said depositing mechanism comprising an upwardly inclined surface arranged to receive and support crackers to be deposited with filling material, and spaced cross members actuated intermittently in relation to said inclined surface for advancing crackers upwardly on said inclined surface to receive a deposit of filling material, the intermittent actuation of said cross members being timed in relation to the operation of said depositing mechanism whereby said crackers are deposited with filling material while said crackers are moved, and the inclined disposition of said conveyor surface upwardly and beyond said depositing mechanism disposing said moving crackers whereby said strips of filling material are directed in a substantially horizontal plane onto said crackers.

4. In a sandwich making machine of the character described, the combination of a filling material depositing mechanism comprising means for containing a supply of filling material, a plurality of meshing pairs of fluted rollers adapted for feeding filling material, agitating means arranged in said containing means for bringing filling material to said fluted rollers free of entrained air, a plurality of orifices corresponding to the number of said pairs of fluted rollers arranged in delivery relation with respect to said rollers, said orifices opening in a vertical plane and being thereby adapted to form and direct a strip of filling material horizontally onto crackers to be deposited with filling material, and means associated with said orifices for severing said strips of filling material in filling lengths; and an upwardly inclined conveying means passing in close angular relationship upwardly and beyond the orifices of said depositing mechanism comprising an upwardly inclined surface arranged to receive and support crackers to be deposited with filling material, and spaced cross members actuated intermittently in relation to said inclined surface to receive a deposit of filling material, the intermittent actuation of said cross members being timed in relation to the operation of said depositing mechanism whereby said crackers are deposited with filling material while said crackers are moved, and said upwardly inclined surface being disposed to direct the moving crackers upwardly and beyond said depositing mechanism whereby said strips of filling material are directed in a substantially horizontal plane onto said crackers.

5. In a sandwich making machine of the character described, the combination of a filling material depositing mechanism comprising a plurality of meshing pairs of fluted rollers adapted for feeding filling material, orifices associated in delivery relation with respect to said fluted rollers, said orifices opening in a vertical plane and being thereby adapted to form filling material fed by said fluted rollers in strips corresponding to the size of the crackers to be deposited with filling material and to direct said filling material strips in a substantially horizontal plane, and means associated with said orifices for severing strips of filling material in filling lengths; and an upwardly inclined conveying means comprising an upwardly inclined surface arranged to receive and support crackers to be deposited with filling material and to direct the crackers upwardly past and beyond said depositing mechanism to receive the filling material, and cross members movable in relation to said inclined surface for advancing crackers upwardly on said surface, the inclination of said inclined surface being such as to position crackers closely adjacent said depositing mechanism only at said orifices, for receiving the filling material as it issues in a substantially horizontal plane from said orifices.

6. In a sandwich making machine having means for supplying crackers to be deposited with filling material, means for depositing filling material on said crackers characterized by an orifice opening in a vertical plane whereby said orifice is adapted for directing filling material issued by said depositing mechanism in a substantially horizontal plane, and means for supplying additional crackers to complete a sandwich with said crackers having the deposited filling material; the improvement of an upwardly inclined conveying means comprising an upwardly inclined surface arranged to receive and support crackers to be deposited with filling material and to direct the crackers upwardly past and beyond the orifice of said depositing mechanism to receive the filling material, and spaced cross members actuated intermittently in relationship to said inclined surface for advancing crackers upwardly on said inclined surface to receive a deposit of filling material and additional crackers to complete the sandwich, the intermittent actuation of said cross members being timed in relation to the operation of the cracker supply means and filling material depositing means whereby crackers will be received on said inclined surface while said cross members are at rest and said crackers are deposited with filling material while said crackers are moved, and the inclined disposition of said conveyor surface upwardly and beyond said depositing mechanism disposing said moving crackers for receiving the filling material as it issues in a substantially horizontal plane from said depositing mechanism.

HARVEY P. CURLEE.

REFERENCES CITED

The following references are of record in the file of this patent:

UNITED STATES PATENTS

| Number | Name | Date |
|---|---|---|
| 470,200 | Kiddie | Mar. 8, 1892 |
| 546,662 | Gage | Sept. 24, 1895 |
| 776,485 | Baker | Dec. 6, 1904 |
| 864,028 | Peters | Aug. 20, 1907 |
| 1,160,532 | Savy | Nov. 16, 1915 |
| 1,274,606 | Salerno | Aug. 6, 1918 |
| 1,285,402 | Salerno | Nov. 19, 1918 |
| 1,771,117 | Greer | July 22, 1930 |
| 2,394,795 | Manspeaker | Feb. 12, 1946 |